(12) United States Patent
Roman et al.

(10) Patent No.: US 9,737,938 B2
(45) Date of Patent: Aug. 22, 2017

(54) MILLING TOOL

(71) Applicant: SANDVIK INTELLECTUAL PROPERTY AB, Sandviken (SE)

(72) Inventors: Stefan Roman, Valbo (SE); Per Viklund, Gavle (SE)

(73) Assignee: SANDVIK INTELLECTUAL PROPERTY AG, Sandviken (SE)

( * ) Notice: Subject to any disclaimer, the term of this patent is extended or adjusted under 35 U.S.C. 154(b) by 155 days.

(21) Appl. No.: 14/591,286

(22) Filed: Jan. 7, 2015

(65) Prior Publication Data

US 2015/0190867 A1     Jul. 9, 2015

(30) Foreign Application Priority Data

Jan. 8, 2014   (EP) ..................... 14150473

(51) Int. Cl.
*B23C 5/06*      (2006.01)
*B23C 5/20*      (2006.01)

(52) U.S. Cl.
CPC ............... *B23C 5/06* (2013.01); *B23C 5/207* (2013.01); *B23C 2200/0488* (2013.01);
(Continued)

(58) Field of Classification Search
CPC .. B23C 5/02; B23C 5/20; B23C 5/202; B23C 5/207; B23C 2200/0405; B23C 2200/12; B23C 2200/208; B23C 2200/0488; B23C 2200/125; B23C 2200/365; B23C 2200/286; B23C 2210/205; B23C 2210/045; B23C 2210/206;
(Continued)

(56) References Cited

U.S. PATENT DOCUMENTS 3,229,349 A * 1/1966 Leksell ................. B23C 5/207
407/113
5,807,031 A   9/1998 Arai et al.
(Continued)

FOREIGN PATENT DOCUMENTS

KR   WO 2008099984 A1 *  8/2008   ............. B23C 5/202
SE      EP 2492035 A1 *    8/2012   ............... B23C 5/06

*Primary Examiner* — Daniel Howell
*Assistant Examiner* — Nicole N Ramos
(74) *Attorney, Agent, or Firm* — Corinne R. Gorski

(57) ABSTRACT

A face milling tool includes a tool body having a central rotation axis around which the tool is rotatable, and at least one insert seat formed in a transition between a front end and an envelope surface of the tool. The tool further includes at least one cutting insert mounted in the insert seat, the cutting insert having an upper side defining an upper extension plane, a cutting edge extending around the circumference of the upper side, and a lower side defining a lower extension plane directed towards the bottom support surface of the insert seat. A center axis extends perpendicularly through the upper and the lower extension planes. The tool is configured such that a main cutting edge portion is at an entering angle κ smaller than 80° and such that the upper extension plane is at a radial tipping-in angle $-60° \leq \gamma_f \leq -25°$ and at an axial tipping-in angle $-20° \leq \gamma_m \leq 0°$, such that an angle of inclination λ of the main cutting edge portion is within the range $15° \leq \lambda \leq 50°$.

16 Claims, 5 Drawing Sheets

(52) U.S. Cl.
  CPC .. *B23C 2200/125* (2013.01); *B23C 2200/286* (2013.01); *B23C 2210/045* (2013.01); *B23C 2210/205* (2013.01); *B23C 2210/206* (2013.01); *Y10T 407/1924* (2015.01)

(58) Field of Classification Search
  CPC ......... Y10T 407/2202; Y10T 407/2214; Y10T 407/2272; Y10T 407/2274; Y10T 407/23; Y10T 407/235; Y10T 407/24; Y10T 407/245
  See application file for complete search history.

(56) References Cited

U.S. PATENT DOCUMENTS

| | | | |
|---|---|---|---|
| 5,951,214 A * | 9/1999 | Rothballer | B23C 5/2213 407/113 |
| 6,200,072 B1 * | 3/2001 | Andersson | B23C 5/202 407/34 |
| 6,884,006 B2 | 4/2005 | Nagashima | |
| 2007/0003384 A1 | 1/2007 | Smilovici et al. | |
| 2007/0297865 A1 * | 12/2007 | Hessman | B23C 5/207 407/114 |
| 2010/0202839 A1 | 8/2010 | Fang | |
| 2012/0009029 A1 | 1/2012 | Saji | |
| 2012/0128440 A1 | 5/2012 | Ishi | |

\* cited by examiner

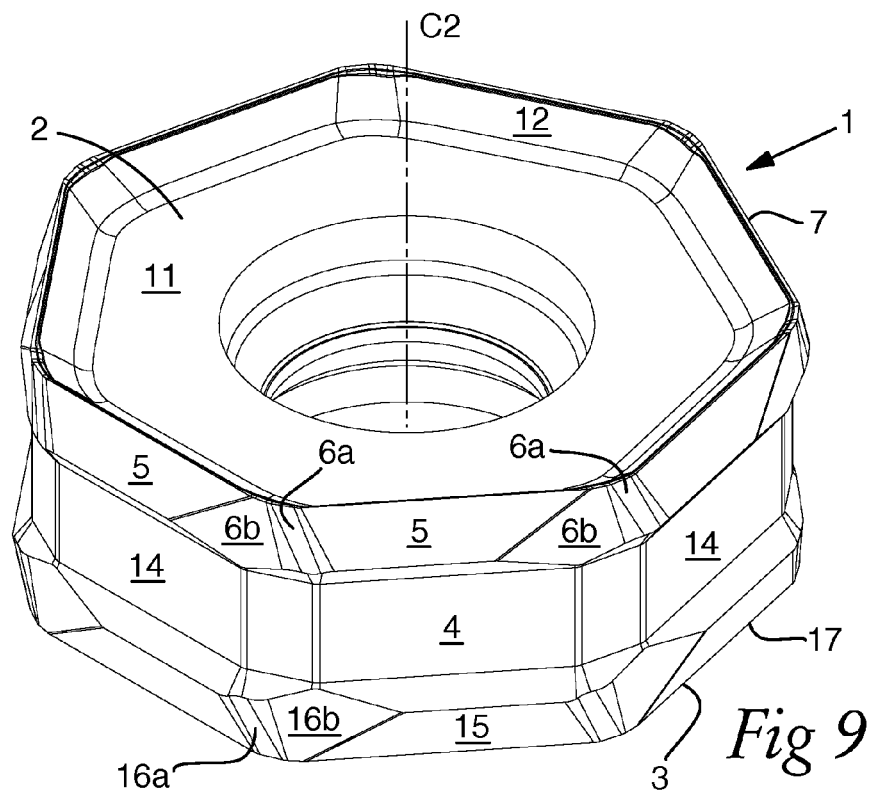
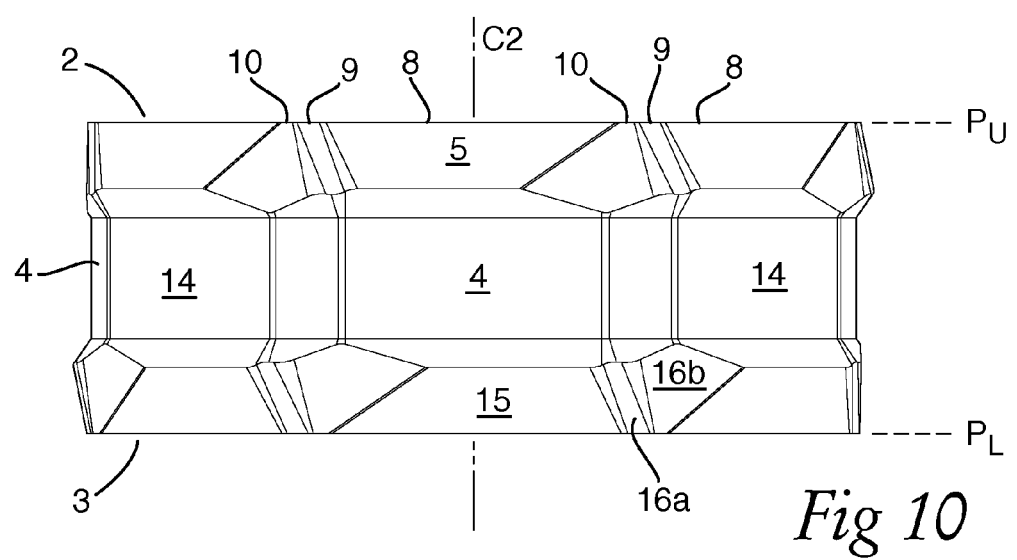

MILLING TOOL

RELATED APPLICATION DATA

This application claims priority under 35 U.S.C. §119 to EP Patent Application No. 14150473.8, filed on Jan. 8, 2014, which the entirety thereof is incorporated herein by reference.

TECHNICAL FIELD

The present disclosure relates to a face milling tool configured for chip-removing machining and having a tool body and at least one cutting insert.

BACKGROUND

A face milling tool of the known type configured for chip-removing machining typically comprises a tool body including a front end and a rear end, between which a central rotation axis extends around, which the tool is rotatable in a direction of rotation. At least one insert seat is formed in a transition between the front end and an envelope surface extending between the front end and the rear end of the tool body. Each insert seat has a bottom support surface, wherein a chip pocket is provided in front of the at least one insert seat in the direction of rotation of the tool. The tool further includes at least one cutting insert securely mounted in the at least one insert seat. Each cutting insert has an upper side defining an upper extension plane and a cutting edge extending around the circumference of the upper side. The insert also includes a lower side defining a lower extension plane parallel to the upper extension plane, the lower side having a support face directed towards the bottom support surface of the insert seat. A center axis extends perpendicularly through the upper extension plane and the lower extension plane.

U.S. Pat. No. 5,807,031 discloses a milling tool of the above-mentioned type. The tool is configured such that a main cutting edge portion is at an entering angle κ smaller than 80°. The upper extension plane of the cutting insert is at a radial tipping-in angle (radial rake angle) $\gamma_f$ and at an axial tipping-in angle (axial rake angle) $\gamma_m$ and the main cutting edge portion is at an angle of inclination λ with respect to the central rotation axis of the tool as measured in a plane tangential to the main cutting edge portion. It is disclosed that spiral chips may be discharged using a negative double-sided cutting insert at acute entering angles despite the fact that both the axial and the radial tipping-in angles are negative, if the cutting insert is shaped such that the angle of inclination is positive and set to 5° or larger.

SUMMARY

It is an aspect of the present disclosure to provide a milling tool with improved cutting behaviour. In particular, it is an object to provide a milling tool with which it is possible to achieve not only excellent chip formation and chip evacuation properties, but also an improved toughness behaviour of the cutting edge and a smoother machining resulting in reduced vibrations and lower noise levels of the tool.

This is achieved by the milling cutter initially defined, which is characterised in that the axial tipping-in angle $\gamma_m$ is within the range $-20°\leq\gamma_m\leq0°$, the radial tipping-in angle $\gamma_f$ is within the range $-60°\leq\gamma_f\leq-25°$, and the angle of inclination λ is within the range $15°\leq\lambda\leq50°$. The large negative radial tipping-in angle ensures, for acute entering angles, a large positive angle of inclination λ. A large angle of inclination λ within the above mentioned range contributes to a smooth machining, since the cutting insert enters the workpiece gradually. More specifically, it enters the workpiece with the lower end of the chip-removing main cutting edge portion closest to the generated surface first, before the upper end of the main cutting edge portion enters. This reduces vibrations and thereby the noise level of the tool. Furthermore, the toughness behaviour of the main cutting edge portion is improved due to that tools with large angles of inclination tend to show improved toughness behaviour in demanding operations, especially at the end of the cut, which is where the produced chip has around its maximum thickness.

A further advantage with the large negative radial tipping-in angle $\gamma_f$ of the tool is the easily accessible insert seat that makes the tool production easier and thereby reduces the production costs of the tool, and which is also advantageous when changing cutting inserts or when rotating an indexable cutting insert to a different index position. For milling tools with large diameters and screw mounted cutting inserts, the large negative radial tipping-in angle and the thereby easy accessible insert seats offer enhanced possibilities to form threaded screw holes. It is therefore possible to achieve a large number of cutting inserts per tool.

According to one embodiment, the cutting insert has a circumference which is the same or essentially the same in the upper extension plane and in the lower extension plane. Thus, the cutting insert has a negative basic shape, allowing for cutting edges to extend around both the upper and the lower side of the cutting insert. According to a variation of this embodiment, the cutting insert is double-sided with a cutting edge extending also around the circumference of the lower side. This doubles the service life of the cutting inserts and thus provides for better tool economy.

According to one embodiment, the upper side and the lower side of the cutting insert are connected by at least one side surface including a clearance surface, the main cutting edge portion being formed in the transition between the clearance surface and the upper side, wherein the clearance surface is formed at an obtuse inner angle with respect to the upper extension plane $P_U$ as seen in side elevation view. In other words, the clearance surface is inclined outwards. This reduces the clearance angle behind the main cutting edge portion in comparison with a cutting insert having a vertical clearance surface and contributes to the strength of the cutting edge. The clearance angle is the angle between on one hand the main clearance surface located rotationally behind the chip-removing main cutting edge portion and on the other hand the generally cone-shaped surface generated by the same. For example, the obtuse inner angle should be within the range 93°-118°, more preferably 98°-114°, in order to get sufficient clearance without compromising the edge strength.

According to one embodiment, the cutting insert is indexable with a plurality of index positions, each index position comprising a main cutting edge portion. This prolongs the service life of the cutting insert and thus provides for better tool economy.

According to one embodiment, the cutting insert on its upper side includes at least five main cutting edge portions, moreover at least seven main cutting edge portions. The large number of cutting edges prolongs the service life of the cutting insert in comparison with a cutting insert with a smaller number of edges.

According to one embodiment, the angle of inclination λ is within the range 20°≤λ≤50°. Within this range, the angle of inclination is optimised for good toughness behaviour of the cutting edges and smooth machining. It is most often useful to have an angle of inclination within the higher end of the range, but there are a geometrical relationships between the entering angle κ and the angle of inclination λ that make it easier to achieve a large angle of inclination λ on a tool with a small entering angle κ.

According to one embodiment, the axial tipping-in angle $\gamma_m$ is within the range −20°≤$\gamma_m$≤−2°, preferably within the range −18°≤$\gamma_m$≤−4°. Since the axial tipping-in angle determines the clearance behind a secondary cutting edge in the form of surface-wiping edge or a curved edge with a corner radius, it should be adjusted to achieve a suitable clearance for the cutting insert used. In the cases where a cutting insert with a right angle between the upper extension plane and a clearance surface rotationally behind the secondary cutting edge is used, it is preferable to keep the axial tipping-in angle within the range −12°≤$\gamma_m$≤−4° in order to achieve a clearance which is sufficient, but still small enough not to cause problems with reduced edge strength. For a cutting insert with a slightly obtuse angle between the upper extension plane and a clearance surface rotationally behind the secondary cutting edge, the range may be shifted towards more negative angles in order to achieve sufficient clearance.

According to one embodiment, the radial tipping-in angle $\gamma_f$ is within the range −50°≤$\gamma_f$≤−30°. Within this range, suitable angles of inclination λ can be achieved for acute entering angles κ. Generally, for smaller entering angles κ, the radial tipping-in angle $\gamma_f$ can be set to larger negative values within the above range, thereby achieving a larger positive angle of inclination λ, without compromising the rake angle and the clearance angle of the tool. For example, the radial tipping-in angle $\gamma_f$ is within the range −50°≤$\gamma_f$≤−35°.

According to one embodiment, the entering angle κ is within the range 10°≤κ≤65°. Within this range, the effect that the negative radial tipping-in angle has on the angle of inclination is especially pronounced. A more negative radial tipping-in angle contributes to a more positive angle of inclination. The smaller the entering angle is and the more negative the radial tipping-in angle is, the larger the resulting angle of inclination will be. A small entering angle κ, such as around 25°, is generally suitable for high-feed milling with low depths of cut, while an entering angle closer to the upper limit, such as around 45°, is more suitable for large cutting depths and lower feed rates. For example, the entering angle κ is within the range 20°≤κ≤50°.

According to one embodiment, the bottom support surface of the insert seat extends in a plane parallel to the upper extension plane $P_u$ of the cutting insert. In this way, axial and negative tipping-in angles may be achieved without the use of shims. Of course, it is also possible to use shims to adjust the tipping-in angles.

According to one embodiment, the upper side of the cutting insert comprises an upper base surface extending in parallel with the upper extension plane $P_u$, which upper base surface is recessed with respect to the main cutting edge portion. In this embodiment, it is possible to achieve a positive rake angle, resulting in improved chip formation and chip evacuation, lower cutting forces and thus also reduced power consumption. Generally, a larger negative radial tipping-in angle $\gamma_f$ requires a deeper recess in the upper surface in order to avoid chip evacuation problems.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 9 is a perspective view of a cutting insert for use in a milling tool according to the disclosure.
FIG. 10 is a side view of the cutting insert in FIG. 8.

DETAILED DESCRIPTION OF THE EMBODIMENTS

Figure 1:
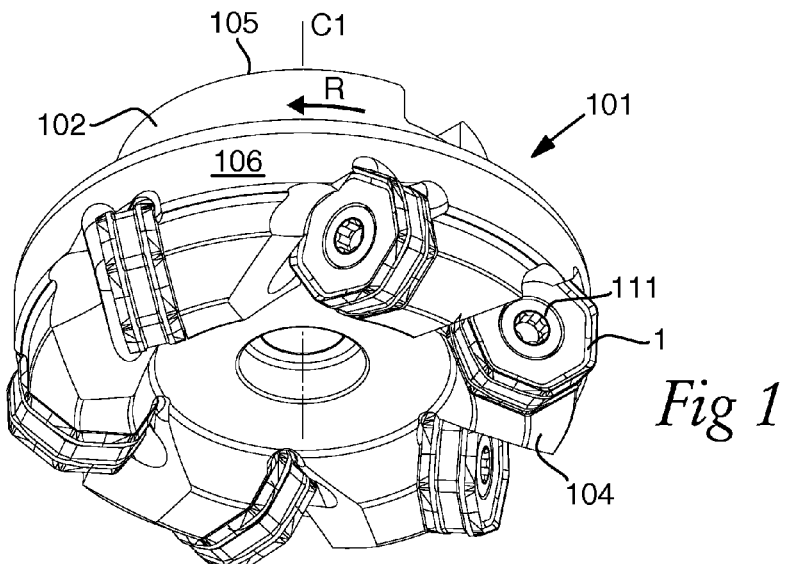
FIG. 1 is a perspective view of a milling tool according to the disclosure.
Figure 2:
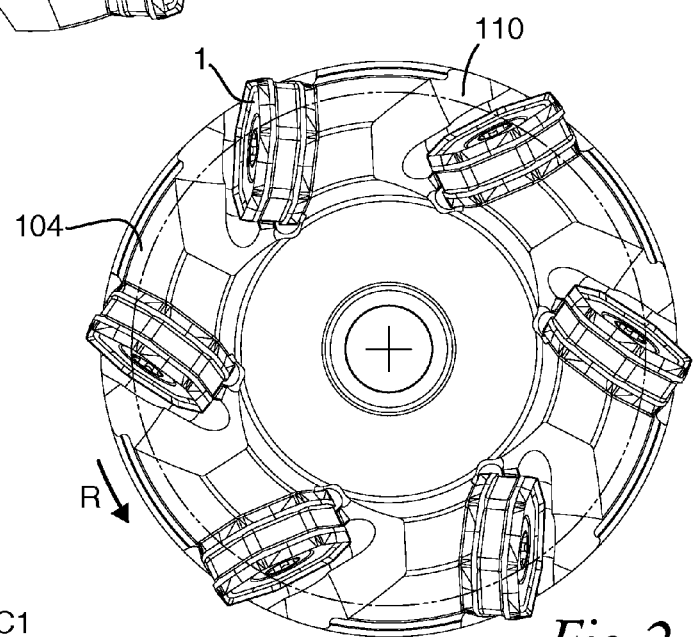
FIG. 2 is an end view of the milling tool in FIG. 1.
Figure 3:
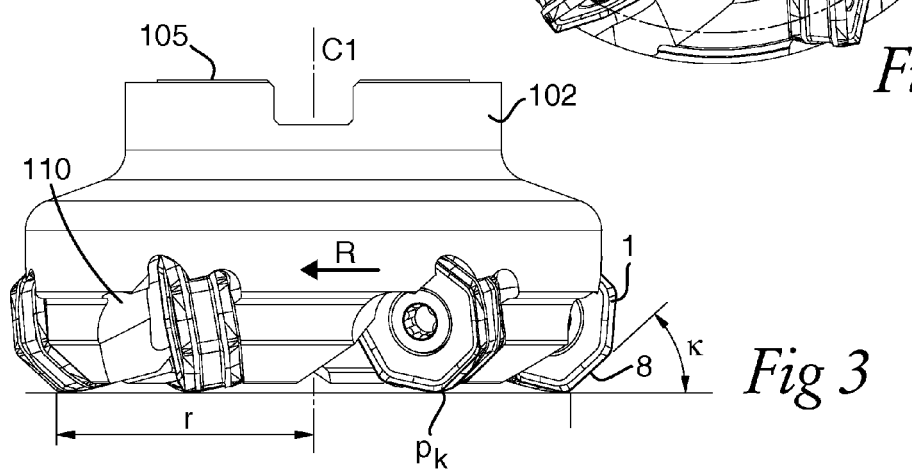
FIG. 3 is a side view of the milling tool in FIG. 1.
Figure 4:
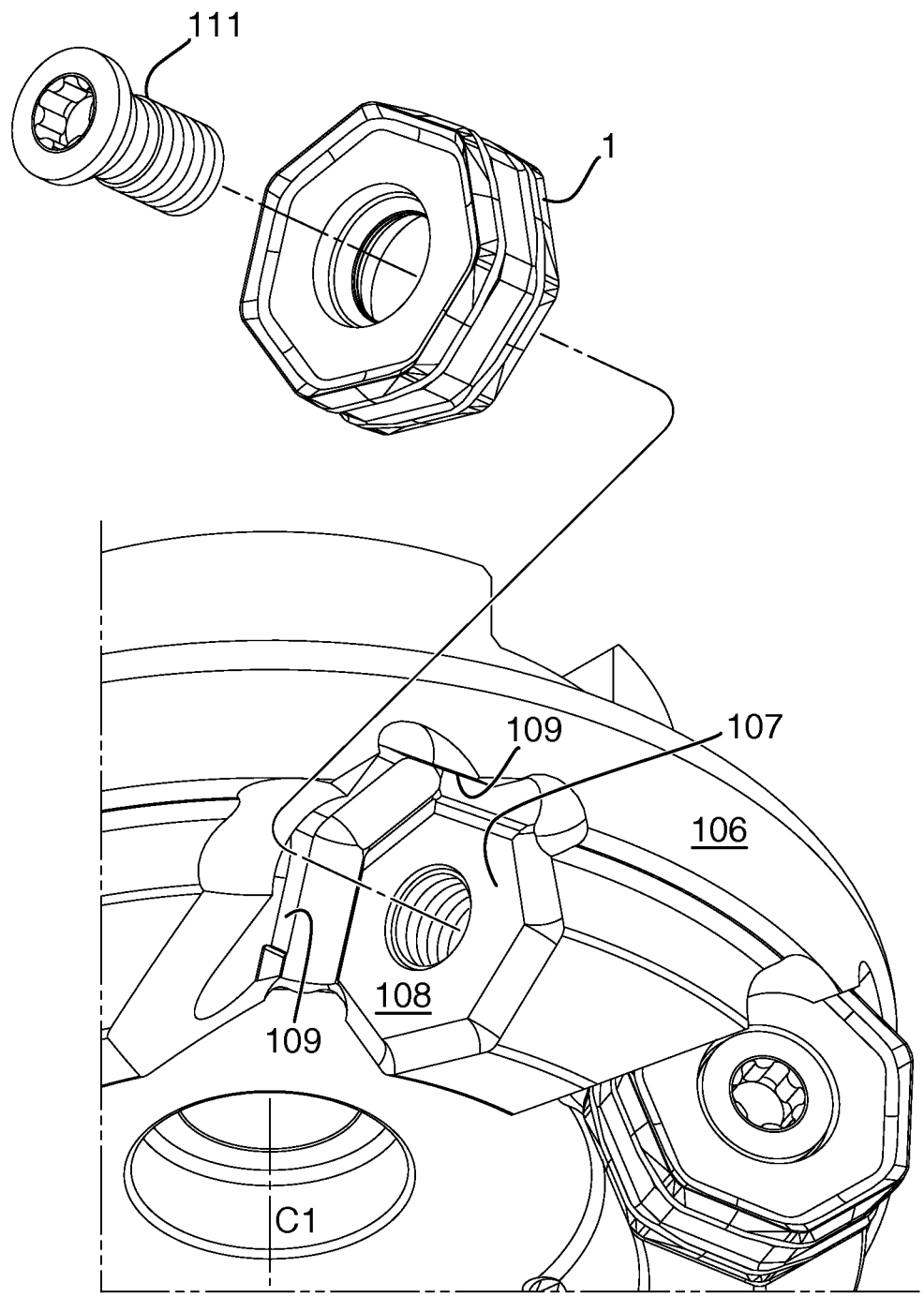
FIG. 4 is an exploded perspective view of the milling tool in FIG. 1.

A face milling tool 101 according to an embodiment of the disclosure is shown in FIGS. 1-4. The milling tool 101 includes a tool body 102 and six cutting inserts 1. The tool body 102 includes a front end 104 and a rear end 105, between which a central rotation axis C1 extends. The tool is rotatable in a direction of rotation R around the central rotation axis C1 and an envelope surface 106 is concentric with the axis C1.

Six insert seats 107 are formed in a transition between the front end 104 and the envelope surface 106. Each insert seat 107 includes a bottom support surface 108, a side support 109 comprising two side support surfaces, and a chip pocket 110 provided in front of the insert seat in the direction of rotation R of the tool 101. The cutting inserts 1 are securely and detachably mounted in the insert seats 107 by means of a screw 111.

A cutting insert 1 suitable for use in the milling tool according to the disclosure is shown in further detail in FIGS. 9-10. The cutting insert 1 is indexable and double-sided and has an upper side 2 defining an upper extension plane $P_U$ and a lower side 3 defining a lower extension plane $P_L$ parallel to the upper extension plane $P_U$. An upper cutting edge 7 extends around the circumference of the upper side 2 and a lower cutting edge 17 extends around the lower side 3. The upper side 2 includes a recessed upper base surface 11. An inclined chip surface 12 extends between the recessed base surface 11 and the cutting edge 7. Since the cutting insert is double-sided, the lower side 3 also has a recessed base surface, which functions as a support face directed towards and resting against the bottom support surface 108 of the insert seat 107. A center axis C2 extends perpendicularly through the upper extension plane $P_U$ and the lower extension plane $P_L$.

The upper side 2 and the lower side 3 of the cutting insert 1 are connected by a side surface 4, which includes several main clearance surfaces 5, 15 and secondary clearance surfaces 6a, 6b, 16a, 16b. The cutting edge 7 has seven essentially rectilinear chip removing main cutting edge portions 8 and, for each main cutting edge portion 8, a first and a second secondary cutting edge portion 9, 10, formed as surface-wiping edges configured for different entering angles κ. Each main cutting edge portion 8 is formed in a transition between the upper side 2 and one of the upper main clearance surfaces 5.

The first secondary cutting edge portion 9 is formed in a transition between the upper side 2 and a first upper secondary clearance surface 6a in a region between two main cutting edge portions 8, that is, in a corner region of the cutting insert 1. The second secondary cutting edge portion 10 is formed in a transition between the upper side 2 and a second upper secondary clearance surface 6b. The cutting insert 1 in this embodiment also comprises, in its side surface 4, several recessed support surfaces 14 forming a "waist" around the cutting insert, serving to stabilise the cutting insert 1 in the insert seat 107 by elongating the contact area of the support surface 14 and the side support 109 of the cutting insert. Thereby, rotation of the cutting insert 1 around its center axis C2 is prevented.

As can be seen in FIGS. 9-10, the main clearance surface 5 is formed at an obtuse inner angle with respect to the upper extension plane $P_U$ as seen in side elevation view. In this embodiment, the inner angle is 107°. The secondary clearance surfaces 6a, 6b are formed at less obtuse inner angles with respect to the upper extension plane $P_U$ as seen in side elevation view.

Figure 7:
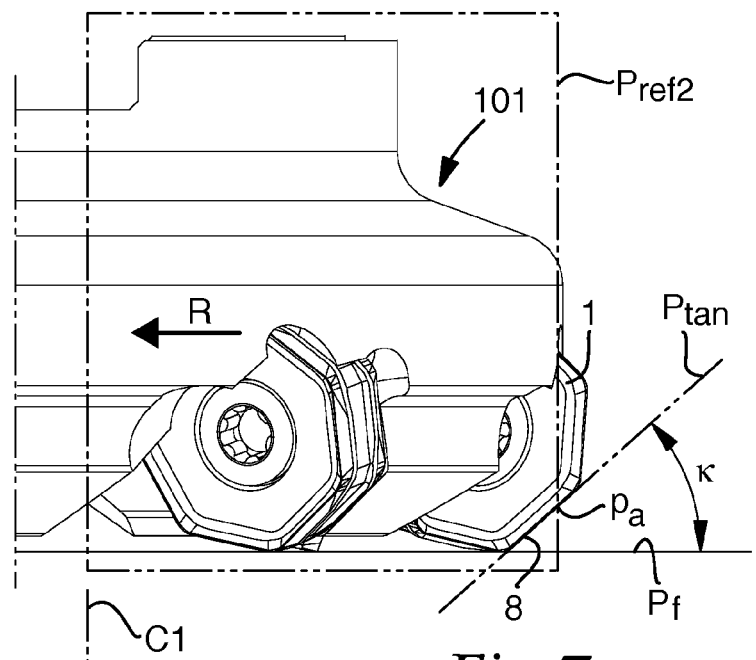
FIG. 7 shows the entering angle in a partial side view of the milling tool in FIG. 1.

The tool shown in FIGS. 1-4 is configured such that a main cutting edge portion 8 is at an entering angle κ of approximately 42°. The entering angle varies along the edge, even though the edge is straight. The entering angle κ is the angle that the main cutting edge portion 8 makes with the direction of feed of the milling tool as seen in side elevation view, see FIG. 7. The entering angle κ is more specifically defined as the angle between a plane $P_{tan}$ and a plane $P_f$ measured in a reference plane $P_{ref2}$, which planes $P_{tan}$, $P_f$ and $P_{ref2}$ will be defined below. At this entering angle, the second secondary cutting edge portion 10 acts as a surface-wiping secondary edge, while the first secondary cutting edge portion 9 acts as a corner edge.

Figure 6:
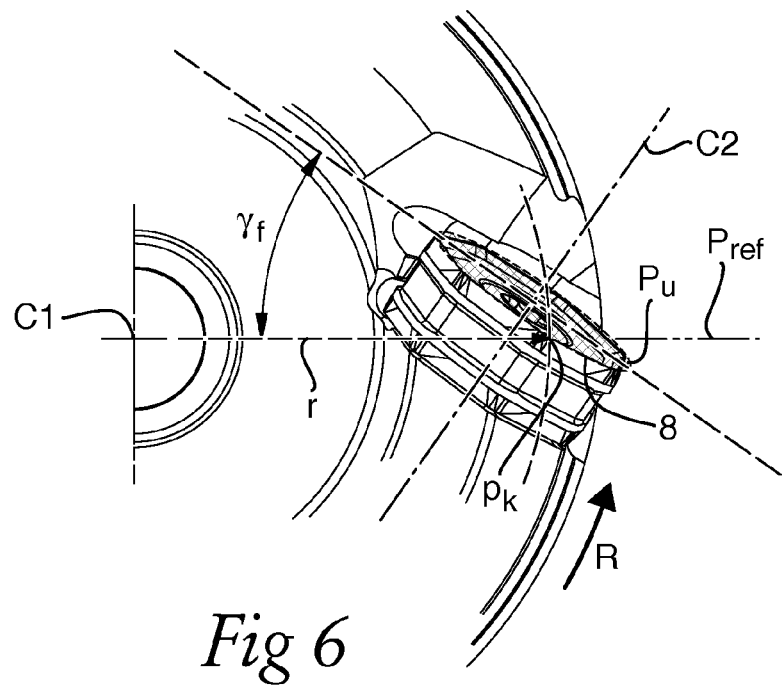
FIG. 6 shows the radial tipping-in angle in a partial planar view of the milling tool in FIG. 1.

The cutting insert 3 is tipped in so that the upper extension plane $P_U$ is at a negative radial tipping-in angle $\gamma_f$ of −35°. The radial tipping-in angle $\gamma_f$, shown in FIG. 6, is the angle between the upper extension plane $P_U$ and a line along a radial vector r of the tool as seen in planar view. More specifically, the radial tipping-in angle $\gamma_f$ is obtained by taking a plane $P_f$ normal to the central rotation axis C1 and passing through a point $p_k$, and in the plane $P_f$ measure the angle between a reference plane $P_{ref}$ and the upper extension plane $P_U$ as shown in FIG. 6, which is a view in the plane $P_f$. The reference plane $P_{ref}$ is a plane spanned by the central rotation axis C1 and a radial vector r perpendicular to the central rotation axis C1 and passing through the point $p_k$. The radius of the tool is measured between the central rotation axis C1 and the point $p_k$, which for this cutting insert is located in the transition between the main cutting edge portion 8 and the surface wiping edge 10 of the cutting insert 1. With a negative radial tipping-in angle $\gamma_f$, the upper extension plane $P_U$ is directed outwards with regard to the central rotation axis C1 of the tool.

Figure 5:
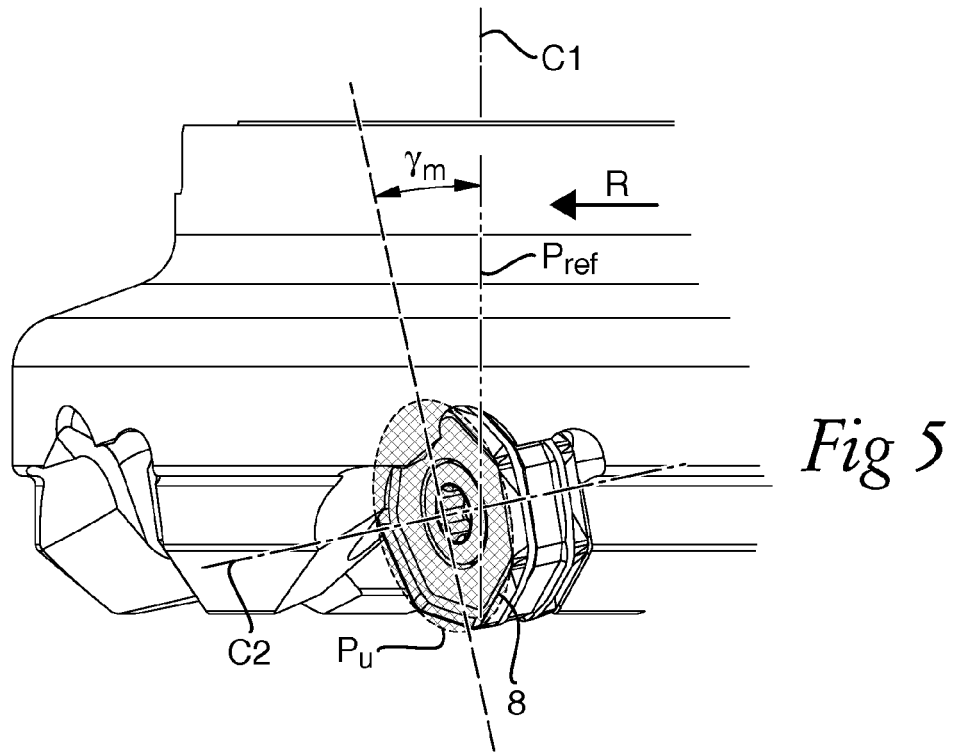
FIG. 5 shows the axial tipping-in angle in a partial side view of the milling tool in FIG. 1.
Figure 8:
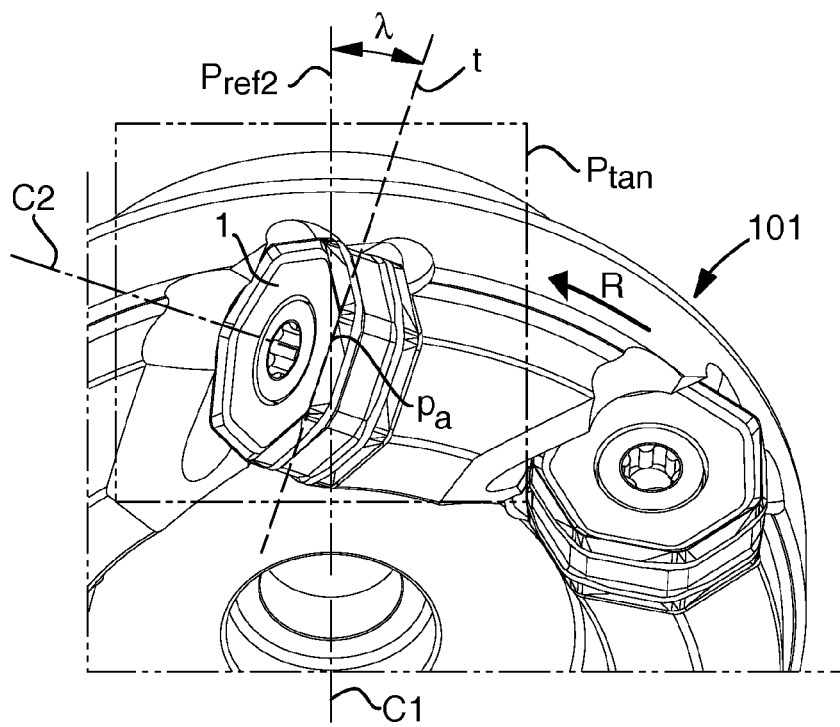
FIG. 8 shows the angle of inclination in a partial perspective view of the milling tool in FIG. 1.

The cutting insert 3 is further tipped in so that the upper extension plane $P_U$ is at a negative axial tipping-in angle $\gamma_m$ of −10°. The axial tipping-in angle $\gamma_m$, shown in FIG. 5, is the angle between the upper extension plane $P_U$ and the central rotation axis C1 of the tool. More specifically, the axial tipping-in angle $\gamma_m$ is obtained by measuring the angle between the upper extension plane $P_U$ and the reference plane $P_{ref}$ in a plane $P_m$ (not shown), which plane $P_m$ is perpendicular to the upper extension plane $P_U$, parallel to the central rotation axis C1 and passes through the point $p_k$. With a negative axial tipping-in angle $\gamma_m$, the upper extension plane $P_U$ is inclined towards the front end 104 of the milling tool. With an entering angle κ of approximately 42°, a radial tipping-in angle $\gamma_f$ of −35° and an axial tipping-in angle $\gamma_m$ of −10°, the main cutting edge portion 8 is at an angle of inclination λ of approximately 20°. The angle of inclination λ, shown in FIG. 8, is the angle that the main cutting edge portion 8 in a point $p_a$, or a tangent t to the main cutting edge portion 8 in that point, makes with a second reference plane $P_{ref2}$. The second reference plane $P_{ref2}$ is parallel with and includes the central rotation axis C1 and includes the point $p_a$ on the main cutting edge portion 8. The angle of inclination λ is measured in a tangential plane $P_{tan}$. The tangential plane $P_{tan}$ is tangential to the main cutting edge portion 8 in the point $p_a$ and is perpendicular to the second reference plane $P_{ref2}$. In FIG. 8, the angle of inclination λ is shown by looking at the main cutting edge portion 8 from below the front end 104 of the tool 101, along a line which is normal to the tangential plane $P_{tan}$.

For the cutting insert 1 according to the first embodiment, the angle of inclination λ is approximately constant along the main cutting edge portion 8, since the main cutting edge portion 8 is essentially rectilinear. For a curved main cutting edge portion, the angle of inclination will vary along the edge. The tangential plane $P_{tan}$ should in that case be taken as a tangential plane to the main cutting edge portion in the point on the main cutting edge where the angle of inclination λ needs to be determined.

As can be seen in FIGS. 9-10, the main clearance surface 5 is formed at an obtuse inner angle with respect to the upper extension plane $P_U$ as seen in side elevation view. In this embodiment, the inner angle is 107°. The secondary clearance surfaces 6a, 6b are formed at less obtuse inner angles with respect to the upper extension plane $P_U$ as seen in side elevation view. In the shown embodiment, the clearance behind the main cutting edge portion 8 in the direction of rotation R of the tool is optimised with regards to the obtuse inner angle between the upper extension plane $P_U$ and the upper main clearance surface 5, so that the cutting insert 1 has high strength, while still providing sufficient clearance. The clearance behind the surface-wiping secondary cutting edge 10 is sufficient thanks to the negative axial tipping-in angle $\gamma_m$. With the chosen values for the inner angles between the upper extension plane $P_U$ and the clearance surfaces 5, 6a, 6b, the clearance behind the main cutting edge portion 8 and the secondary cutting edge portions 9, 10 is in the shown embodiment in a suitable range. The recessed upper base surface 11 ensures that a positive rake angle is achieved despite the large negative radial tipping-in angle $\gamma_f$, thus ensuring good chip evacuation properties.

In a second embodiment of the milling tool (not shown), the same cutting insert 1 as described above is used, but the tool is configured for an entering angle κ of 25°, in which case the first secondary cutting edge portion 9 acts as a surface-wiping secondary edge. The second secondary cutting edge portion 10 is for moderate cutting depths not active as a cutting edge. However, the second secondary cutting edge portion 10 adjacent the active main cutting edge portion 8 may be used as a prolongation of the main cutting edge portion 8 if the cutting depth is large. For an entering angle κ of 25°, the axial tipping-in angle $\gamma_m$ is in this embodiment set to −17° and the radial tipping-in angle $\gamma_f$ to −45°, in which case the angle of inclination λ of the main cutting edge portion 8 is approximately 33°. The inner angle between the upper extension plane $P_U$ and the secondary clearance surface 6a, located behind the surface-wiping secondary edge 9, is slightly obtuse in order to achieve a suitable clearance behind the surface-wiping secondary edge 9 with the relatively large negative axial tipping-in angle $\gamma_m$. The tool with an entering angle of 25° is suitable for milling with high feed rates and relatively small cutting depths.

The radial and the axial tipping-in angles of the tool according to the disclosure should be adjusted so that the angle of inclination λ is within the range 15°≤λ≤50°, preferably within the range 20°≤λ≤50°.

The invention is not limited to the embodiments disclosed but may be varied and modified within the scope of the following claims. For instance, the cutting insert used may be a cutting insert of a different shape, such as square, rhombic, or round, or polygonal with a different number of main cutting edge portions than described above. In particular, the cutting insert does not need to be configured as a combination cutting insert usable for more than one entering angle. It is also possible to configure the tool for other entering angles than those exemplified above. Moreover, the cutting insert used may be one which gives rise to a clearance which varies along the main cutting edge portion. The cutting insert may also, instead of being screw mounted, be secured by for example clamps. The tool may of course be designed for either left hand rotation or right hand rotation.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A face milling tool configured for chip-removing machining comprising:
   a tool body including a front end and a rear end, between which a central rotation axis extends around which the tool is rotatable in a direction of rotation, and at least one insert seat formed in a transition between the front end and an envelope surface extending between the front end and the rear end of the tool body, the at least one insert seat having a bottom support surface, wherein a chip pocket is provided in front of the at least one insert seat in the direction of rotation of the tool; and
   at least one cutting insert securely mounted in the at least one insert seat, the at least one cutting insert including an upper side defining an upper extension plane, a cutting edge extending around a circumference of the upper side, a lower side defining a lower extension plane parallel to the upper extension plane, the lower side having a support face directed towards the bottom support surface of the insert seat, wherein a center axis extends perpendicularly through the upper extension plane and the lower extension plane, wherein a main cutting edge portion is at an entering angle κ smaller than 80°, the upper extension plane is at a radial tipping-in angle $\gamma_f$ and at an axial tipping-in angle $\gamma_m$, the main cutting edge portion is at an angle of inclination λ, the axial tipping-in angle $\gamma_m$ being within the range −20°≤$\gamma_m$≤0°, the radial tipping-in angle $\gamma_f$ being within the range −60°≤$\gamma_f$≤−25°, and the angle of inclination λ being within the range 15°≤λ≤50°, the upper side and the lower side of the cutting insert being connected by at least one side surface including a clearance surface, the main cutting edge portion being formed in the transition between the clearance surface and the upper side, wherein the clearance surface is formed at an obtuse inner angle with respect to the upper extension plane as seen in a side elevation view.

2. The milling tool according to claim 1, wherein the cutting insert has a circumference which is the same or essentially the same in the upper extension plane and in the lower extension plane.

3. The milling tool according to claim 2, wherein the cutting insert is double-sided with a cutting edge-extending also around the circumference of the lower side.

4. The milling tool according to claim 1, wherein the cutting insert is indexable with a plurality of index positions, each index position including a main cutting edge portion.

5. The milling tool according to claim 4, wherein the cutting insert on its upper side includes at least five main cutting edge portions.

6. The milling tool according to claim 1, wherein the angle of inclination λ is within the range 20°≤λ≤50°.

7. The milling tool according to claim 1, wherein the axial tipping-in angle $\gamma_m$ is within the range −20°≤$\gamma_m$≤−2°.

8. The milling tool according to claim 1, wherein the radial tipping-in angle $\gamma_f$ is within the range −50°≤$\gamma_f$≤−30°.

9. The milling tool according to claim 1, wherein the radial tipping-in angle $\gamma_f$ is within the range −50°≤$\gamma_f$≤−35°.

10. The milling tool according to claim 1, wherein the entering angle κ is within the range 10°≤κ≤65°.

11. The milling tool according to claim 1, wherein the entering angle κ is within the range 20°≤κ≤50°.

12. The milling tool according to claim 1, wherein the bottom support surface of the insert seat extends in a plane parallel to the upper extension plane of the cutting insert.

13. The milling tool according to claim 1, wherein the upper side of the cutting insert includes an upper base surface extending in parallel with the upper extension plane, the upper base surface being recessed with respect to the main cutting edge portion.

14. The milling tool according to claim 4, wherein the cutting insert on its upper side includes at least seven main cutting edge portions.

15. The milling tool according to claim 1, wherein the axial tipping-in angle $\gamma_n$, is within the range −18°≤$\gamma_m$≤−4°.

16. The milling tool according to claim 4, wherein the cutting insert on its upper side includes at least seven main cutting edge portions.

\* \* \* \* \*